No. 699,184. Patented May 6, 1902.
J. JONES.
DRAFT EQUALIZER.
(Application filed Oct. 10, 1901.)
(No Model.)
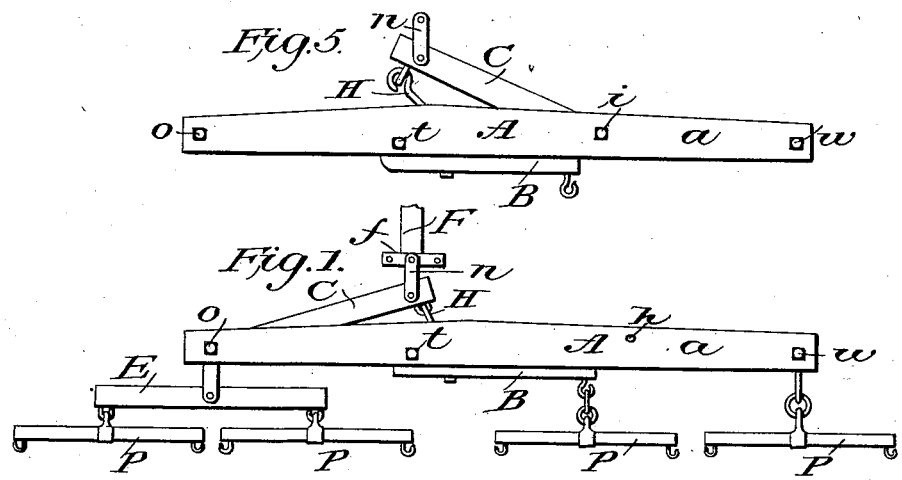
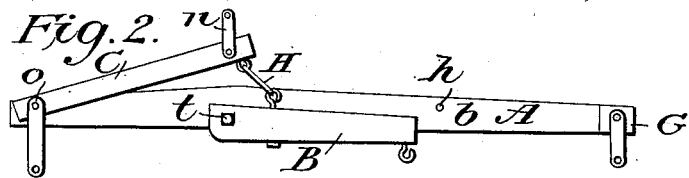
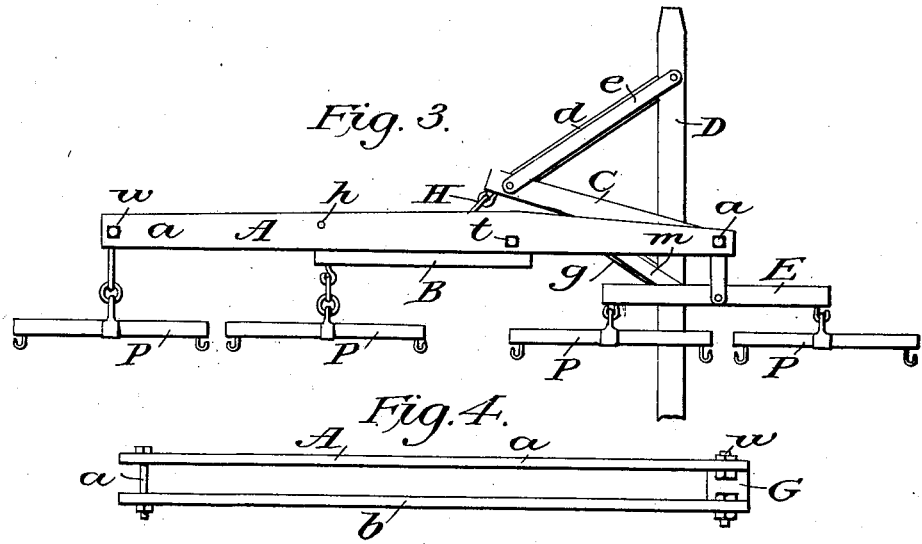
Witnesses:
Louis H. Pine.
H. F. Seaman
Inventor:
James Jones
By Thomas B. Swan
His Attorney.

UNITED STATES PATENT OFFICE.

JAMES JONES, OF ATLANTIC, IOWA.

DRAFT-EQUALIZER.

SPECIFICATION forming part of Letters Patent No. 699,184, dated May 6, 1902.

Application filed October 10, 1901. Serial No. 78,171. (No model.)

*To all whom it may concern:*

Be it known that I, JAMES JONES, a citizen of the United States of America, residing at the city of Atlantic, in the county of Cass and State of Iowa, have invented certain new and useful Improvements in Draft - Equalizers; and I do declare the following to be a full, clear, and exact description of the invention, such as will enable others skilled in the art to which it appertains to make and use the same, reference being had to the accompanying drawings, and to the letters of reference marked thereon, which form a part of this specification.
My invention relates to improvements in four-horse equalizers; and it consists in the peculiar construction and combination of the parts that will be more fully set forth hereinafter, and particularly pointed out in the claims.

The object of my invention is to furnish a draft-equalizer for working four horses abreast, to be used in connection with harvesting-machines, plows, and other agricultural implements, which will be durable, simple of construction, and easy to apply to harvesting-machines, plows, and other agricultural implements. I attain this object by the device illustrated in the accompanying drawings, in which—

Figure 1 is a top or plan view of the draft-equalizer applied to a right-hand plow. Fig. 2 is a plan view of the draft-equalizer having the doubletree, singletrees, and a section of the lever A removed. Fig. 3 is a plan view of the draft-equalizer secured to the pole of a self-binding harvester. Fig. 4 is a view in side elevation of the lever A; and Fig. 5 is a plan view of the draft-equalizer having the doubletree and singletrees removed and showing a modified construction of the same.

Similar letters refer to similar parts throughout the several views.

F represents the forward part of an ordinary plow-beam having the head *f*.

A is a lever composed of two sections *a* and *b*, bolted together and having the block G resting between the sections.

B is a lever pivotally connected to the lever A by means of the bolt *t* and rests and plays between the sections *a* and *b* of the lever A.

C is a support which rests and plays between sections *a* and *b* of the lever A and which is pivoted at one end to the lever A.

H is a link connected at one end by means of an eyebolt to the end of the support C and connected at the other end by means of an eyebolt to the lever B.

*n* is a clevis by means of which the draft-equalizer is attached to a plow.

E is an ordinary doubletree.

P is an ordinary singletree.

D represents the rear portion of the pole or tongue of a self-binding harvester constructed in the ordinary manner. When the equalizer is attached to a self-binding harvester, the clevis *n* is removed, and the draft-equalizer is secured to the pole of the harvester by means of the brackets *g* and *m* and the straps *e* and *d*. The bracket *m* is secured to the upper side of the pole and to the under side of the support C, and the bracket *g* is secured to the under side of the pole and to the under side of the support C. The strap *e* is secured to the upper side of the pole and the upper side of the support C, and the strap *d* is secured to the under side of the pole and the under side of the support.

I prefer to pivot the support C to the lever A by means of the bolt *o*; but it can be extended toward the other end of the lever A and pivoted by the bolt *i*, as shown in Fig. 5, or it can be made of sufficient length to be pivoted by the bolt *w* to the lever A.

From the foregoing description the operation of the equalizer becomes apparent.

Having thus described my invention, what I claim as new, and desire to secure by Letters Patent, is—

1. The combination in a four-horse equalizer of the support C pivoted to the lever A, and adapted to be secured to an agricultural implement, the lever B pivoted to the lever A, and secured to the support C, and the lever A having a doubletree and a singletree secured thereto, substantially as described.

2. The combination in a four-horse equalizer of the support C having one of its ends pivoted to and within the lever A, and adapted to be secured to an agricultural implement, the lever B which is pivoted to the lever A and plays within the same and which is secured between its ends to the support C, and the lever A having a slot for the reception of the support C and the lever B, substantially as described.

Signed by me at the city of Atlantic, in the county of Cass and State of Iowa, this 7th day of October, A. D. 1901.

JAMES JONES.

Witnesses:
WILLIAM R. JONES,
HARVEY J. FRITZ.